(12) United States Patent
Mekuria

(10) Patent No.: US 10,762,667 B2
(45) Date of Patent: Sep. 1, 2020

(54) METHOD AND APPARATUS FOR COMPRESSION OF POINT CLOUD DATA

(71) Applicant: Point Cloud Compression, B.V., Amsterdam (NL)

(72) Inventor: Rufael Negatu Mekuria, Amsterdam (NL)

(73) Assignee: Point Cloud Compression, B.V., Amsterdam (NL)

( * ) Notice: Subject to any disclaimer, the term of this patent is extended or adjusted under 35 U.S.C. 154(b) by 22 days.

(21) Appl. No.: 16/207,087

(22) Filed: Nov. 30, 2018

(65) Prior Publication Data

US 2020/0175725 A1    Jun. 4, 2020

(51) Int. Cl.
 *G06T 9/40* (2006.01)
 *G06T 15/08* (2011.01)

(52) U.S. Cl.
 CPC .............. *G06T 9/40* (2013.01); *G06T 15/08* (2013.01)

(58) Field of Classification Search
 None
 See application file for complete search history.

(56) References Cited

U.S. PATENT DOCUMENTS

| | | |
|---|---|---|
| 6,262,737 B1 | 7/2001 | Li et al. |
| 6,525,722 B1 | 2/2003 | Deering |
| 6,532,012 B2 | 3/2003 | Deering |
| 6,563,500 B1 | 5/2003 | Kim et al. |
| 6,717,577 B1 * | 4/2004 | Cheng ................ G06F 12/0875 345/419 |
| 7,804,498 B1 | 9/2010 | Graham et al. |
| 8,022,951 B2 | 9/2011 | Konushin |
| 8,805,097 B2 | 8/2014 | Ahn |

(Continued)

FOREIGN PATENT DOCUMENTS

| | | |
|---|---|---|
| CN | 100495442 C | 6/2009 |
| CN | 102682103 B1 | 3/2014 |

(Continued)

OTHER PUBLICATIONS

Alliez, et al., "Progressive compression for lossless transmission of triangle meshes", Proceedings of the 28th annual conference on Comp.

(Continued)

*Primary Examiner* — Said Broome
(74) *Attorney, Agent, or Firm* — Pablo Meles

(57) ABSTRACT

A method for point cloud coding (200 or 300) or decoding (400 or 500) includes identifying (201) a plurality of quantized points in 3D space, defining (202), a sequence order of the quantized points in 3D space, and identifying (203) differential vector patterns in the sequence order of quantized points in 3D space. The method further includes identifying (204) Morton Index Differences in the sequence order of quantized points in 3d space, coding (205) the one or more quantized points in 3D space using differential vector patterns in a first plurality of codewords, coding (206) the one or more quantized points in 3D space using the Morton index differences in a second plurality of codewords, combining (207) the first and second plurality of codewords into a third plurality of codewords, and coding (208) the third plurality of codewords using an entropy coding scheme into a bitstream.

20 Claims, 8 Drawing Sheets

(56) References Cited

U.S. PATENT DOCUMENTS

| | | | |
|---|---|---|---|
| 8,811,758 | B2 | 8/2014 | Paffenroth |
| 8,884,953 | B2 | 11/2014 | Chen et al. |
| 8,949,092 | B2 | 2/2015 | Cai et al. |
| 9,064,311 | B2 | 6/2015 | Mammou et al. |
| 9,111,333 | B2 | 8/2015 | Jiang et al. |
| 9,171,383 | B2 | 10/2015 | Ahn et al. |
| 9,269,187 | B2 * | 2/2016 | Chang .................. G06T 7/596 |
| 9,787,321 | B1 | 11/2017 | Hemmer |
| 2005/0110790 | A1 * | 5/2005 | D'Amora .............. G06T 17/00 345/419 |

FOREIGN PATENT DOCUMENTS

| | | |
|---|---|---|
| KR | 100420006 B1 | 3/2004 |
| KR | 100927601 B1 | 11/2009 |

OTHER PUBLICATIONS

Gandoin, et al., "Progressive lossless compression of arbitrary simplicial complexes", ACM Transactions on Graphics (TOG), Jul. 23, 2002.

Gumhold, et al., "Predictive point-cloud compression", ACM SIGGRAPH 2005 Sketches, Jul. 31, 2005, 1 page.

Huang, et al., "Octree-Based Progressive Geometry Coding of Point Clouds", SPBG Jul. 2006: 103110, Jul. 29, 2006, pp. 103-110.

Isenburg, "Compression and Streaming of Polygon Meshes", dissertation, retrieved from http://cs.unc.edu/newspublications/doctoral-dissert.

Merry, et al., "Compression of dense and regular point clouds", Computer Graphics Forum, Dec. 1, 2006, pp. 709-716.

Schnabel, "Octree-based Point-Cloud Compression", Eurographics Symposium on Point-Based Graphics, 2006, 11 pages.

Waschbüsch, et al., "Progressive compression of point-sampled models", Eurographics symposium on point-based graphics, Jun. 2, 2004, pp.

J. Kammerl, N. Blodow, R. B. Rusu, S. Gedikli, M. Beetz and E. Steinbach, "Real-time compression of point cloud streams," 2012 IEEE International Conference on Robotics and Automation, Saint Paul, MN, 2012, pp. 778-785.

R. Mekuria, K. Blom and P. Cesar, "Design, Implementation, and Evaluation of a Point Cloud Codec for Tele-Immersive Video," in IEEE Transactions on Circuits and Systems for Video Technology, vol. 27, No. 4, pp. 828-842, Apr. 2017.

* cited by examiner

200

300

400

METHOD AND APPARATUS FOR COMPRESSION OF POINT CLOUD DATA

FIELD

The current invention relates to data compression.

BACKGROUND

A point cloud is a 3D data structure defining positions of points in 3D space and respective attributes such as colors and material properties. A point cloud can be used to represent scanned 3D objects, 3D geographical information and/or volumetric video. Point clouds typically have attributes attached to positions defined in 3D space. Point clouds can also be used for 3D visualization applications in augmented and virtual reality applications. In addition, point clouds can be used to represent 3D assets used in gaming and 3D video. Compression of point cloud data remains a challenge, especially techniques to reduce the huge amounts of computational effort required and techniques required to reduce the bitstream sizes are an important topic for investigation.

SPECIFICATION

Figure 1:
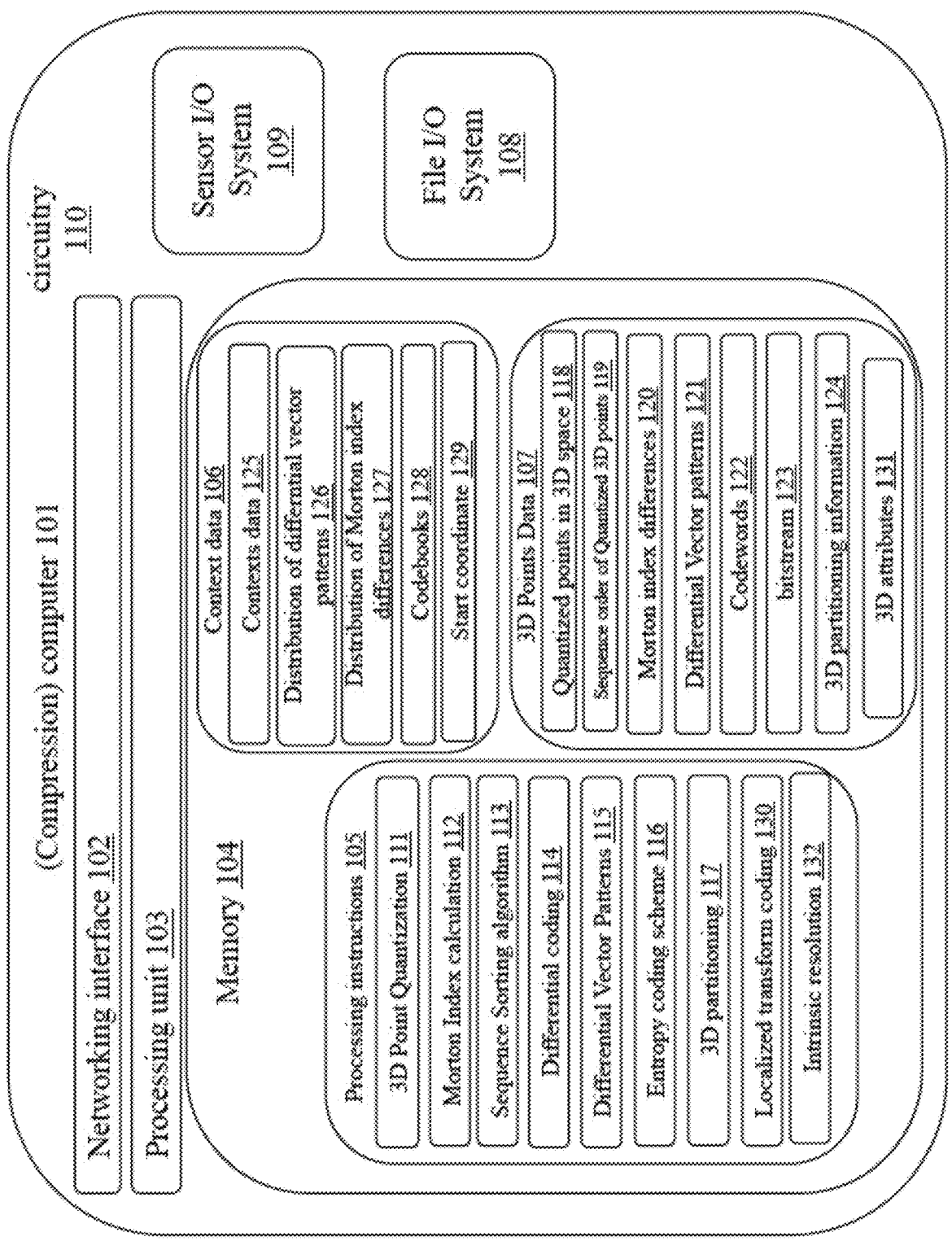
FIG. 1. illustrates a compression computer 101 used to execute the disclosed method for encoding and decoding of 3D Point Cloud data in accordance with the embodiments.

A system or apparatus 100 having a compression computer 101 of FIG. 1 can comprise circuitry 110 having a networking interface 102, a processing unit 103, and memory 104 in addition to a sensor I/O system 109 and a file I/O system 108. The memory 104 can include processing instructions 105, context data 106 and 3D Points data 107. The compression computer 101 executes the instructions in the memory 104 performing the method disclosed in the various embodiments as will be further detailed below. Generally, the processing instructions 105 can include one or more of the instructions for 3D Point Quantization 111, Morton Index calculation 112, sequence sorting algorithm 113, differential coding 114, differential vector patterns 115, entropy coding scheme 116, 3D partitioning 117, localized transform coding 130, and intrinsic resolution 132. The context data 106 can include one or more data or data sets including contexts data 125, distribution of differential vector patterns 126, distribution of Morton index differences 127, codebooks 128 and start coordinate(s) 129. The 3D Points Data 107 can include one or more of quantized points in 3D space 118, sequence order of quantized 3D points 119, Morton Index differences 120, differential vector patterns 121, codewords 122, bitstream 123, 3D partitioning information 124, and 3D attributes 131.

Figure 2:
FIG. 2. illustrates each of the steps involved in the disclosed method for coding point cloud data in accordance with the embodiments.
Figure 3:
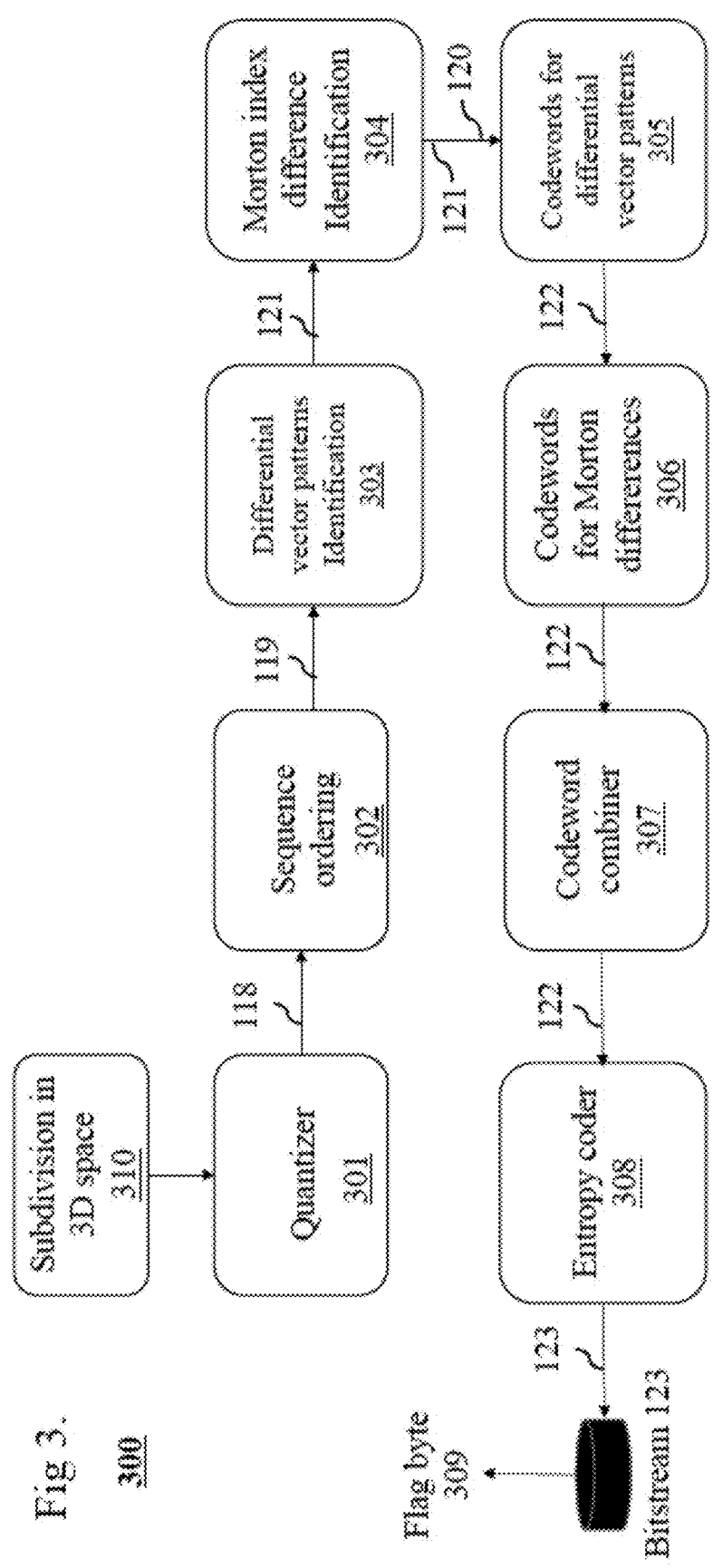
FIG. 3 illustrates the steps involved in the method, or when implemented on an electronic apparatus in accordance with the embodiments.

The flow chart 200 of FIG. 2. illustrates each of the steps involved in the disclosed method for coding point cloud data which can include identification of the quantized points in 3D space, defining a sequence order on the points and then identify differential vector patterns 121 and Morton index differences 120. The results are combined into codewords 122 for entropy coding. Note that the flow charts in the various drawings include inputs and outputs and in some instances multiple inputs and output that are indicated with the appropriate reference numbers. For example, in FIG. 2, the output from 204 (and input to 205) includes multiple inputs or outputs such as (sequence order of quantized 3D points) 119, (Morton Index Differences) 120, and (differential vector patterns) 121. These three outputs are processed together at 205. The output from 205 and input to 206 is just a single reference or item such as codeword(s) 122. FIG. 3 illustrates the steps involved in the method, or when implemented on an electronic apparatus in accordance with the embodiments. The steps can additionally include a subdivision in 3D space to partition the 3D data before encoding it. The flow chart of FIG. 4. illustrates the second method 400 disclosed for decoding which includes using the entropy coding scheme to obtain codewords, then applies the inverse operations such as identifying the start coordinate 129, followed by recovering the points from the Morton index differences and differential vector patterns.

Point clouds are typically compressed before being stored to a hard drive or another storage medium or before it is transmitted over a network interface. For most applications it is important to both have a small bitstream size resulting from the compression and fast execution of the compression by a compression computer 101.

In the embodiments, contrary to conventional work on point cloud compression, two novel coding techniques are introduced and combined into a method for fast and efficient point cloud coding. The embodiments disclosed here disclose both the method for encoding and decoding point cloud data.

The embodiments herein overcomes a problem in 3D delta coding, that uses 3 coordinate differences and limited locality of the points that reduces efficiency of the coding. This disclosure introduces a scheme that uses a 1-dimensional predictor based on coding the Morton Index Differences 120. Our experiments have shown that these differences can be used as an efficient predictor of delta coding of geometric information. Contrary to prior art that includes traversing space filling curves and differential coding 114, Morton index differences 120 are used directly to encode the point cloud data 107. A key feature is that Morton indexes provide well-defined 1-dimensional index related to the position in space. Using these techniques does require a (re-)quantization (see 301 of FIG. 3), that may be configured to match the intrinsic resolution of the point cloud, such as computed using the median smallest nearest neighbors. Point clouds are typically acquired by sampling a 3D model or by 3D scanner with fixed resolution, hence typically they have a frequently occurring minimum neighbor distance.

The flow chart of FIG. 3 illustrates the steps involved in a method or electronic apparatus 300 in accordance with the embodiments and additionally include a subdivision in 3D space 310 to partition the 3D data before encoding it. More specifically, a quantizer 301 quantizes data to provide quantized points in 3D space 118 to a sequence ordering module 302 that provides a sequence order of quantized 3D points 119 to a differential vector pattern identification module 303 that generates differential vector patterns 121. A Morton index difference identification module 304 uses the differential vector patterns to generate Morton index differences 120. A coding module 305 uses the differential vector patterns 121 and the Morton index differences 120 to generate codewords 122 such as codewords for differential vector patterns. Another coding module 306 can use the codewords 122 to generate codewords for Morton differences. A codeword combiner 307 can combine codewords 122 where an entropy coder 308 applies an entropy coding scheme on the codewords 122 resulting in a bitstream 123. Decoding the bitstream 123 can identify a flag byte 309 for selecting the right context data 106. A flag byte can be embedded in the bitstream 123 to signal context selection for the entropy coding scheme 116.

The embodiments disclosed here work well on 3D volumetric video representing human actors using voxelized point clouds. Examples of such point clouds include 3D humans captured in a studio such as those from 8i labs, owlii or Microsoft mixed reality capture.

A novel technique based on differential vector patterns 115 is introduced to exploit regular patterns that occur after sorting point cloud data 107. It is combined with the Morton index prediction (shown in flow chart 500 of FIG. 5) using Morton index differences 120. The data size of differential vector patterns 115 is decreased further by using pre-trained codebooks 128 storing the most frequently occurring differential vector patterns 115 occurring in 3D point clouds. The combined techniques may not always perform better in terms of bitstream size compared to prior art, however the disclosed embodiments features a strong trade-off quality between coding complexity and bit-rate for low latency/complexity applications. In some embodiments, the advantage is that it exploits the properties of the sort order and possibly the voxelized nature of the point cloud of patterns as occurring in the differential vector patterns 121. The introduced method is computationally light when encoding and extremely light when decoding compared to conventional methods using octree-based coding and/or projection based methods. In addition, voxelized data may already be sorted in Morton order reducing the complexity even further.

The following text explains some of the terminology used in the rest of the document in accordance with the embodiments. With reference to FIG. 1 and a representation 600 in FIG. 6, point cloud data typically comprises points in 3D space 603 that have coordinates representing the x, y and z positions in cartesian coordinates 605 in 3D space with respect to some coordinate origin 602 and with respect to one or more coordinate axis 601 in FIG. 6. These 3D point coordinates 605 can be represented on a computer using integer and floating point numbering. In addition, quantized points in 3D space 118 (see FIG. 1) may have single or multiple 3D attributes 131 attached to them, representing properties like the color, material, normal and reflectance properties. These 3D attributes 131 attached to the points in 3D space 603 are useful for storing the characteristics of the 3D object in a memory 104 and rendering the object using rendering techniques such as using shaders, global illumination and/or squat based rendering. In addition, they can be used for rendering compositely on a real-world scene enabling an augmented reality where the 3D point cloud is blended in with the real physical world. One difficulty related to handling points in 3D space 603 as found in 3D point cloud data is the unstructured nature of the points in 3D space. One way to introduce some order to the points in 3D space is by applying a sequence sorting algorithm 113 based on Morton indexes 802 (see flow chart 800 of FIG. 8). This way the 3 coordinates are represented using a single index called a Morton index 802. Using this Morton Index, the points can be sorted in order of ascending or descending order. The Morton order can achieve locality of the data and is easy and fast to compute in practice, as it only requires shift operations and binary operations when executed in a processing unit 103 in the compression computer 101.

Using the Morton index differences 120 in combination with differential vector patterns 121 on 3D coordinates on a sequence order of quantized points in 3D space 118 provides distinct benefits in accordance with the embodiments. The Differential Vector Patterns 121 can be described as differences between the current position and the next K positions for each of the coordinates x,y,z. In the embodiments herein, the chosen vector patterns of length 3, 4 and 5 and in some rare cases more allowing 2, 3 or 4 points can be predicted from a single point in the sequence. The distribution of differential vector patterns can be obtained by online or offline training on a set of training data.

Figure 7:
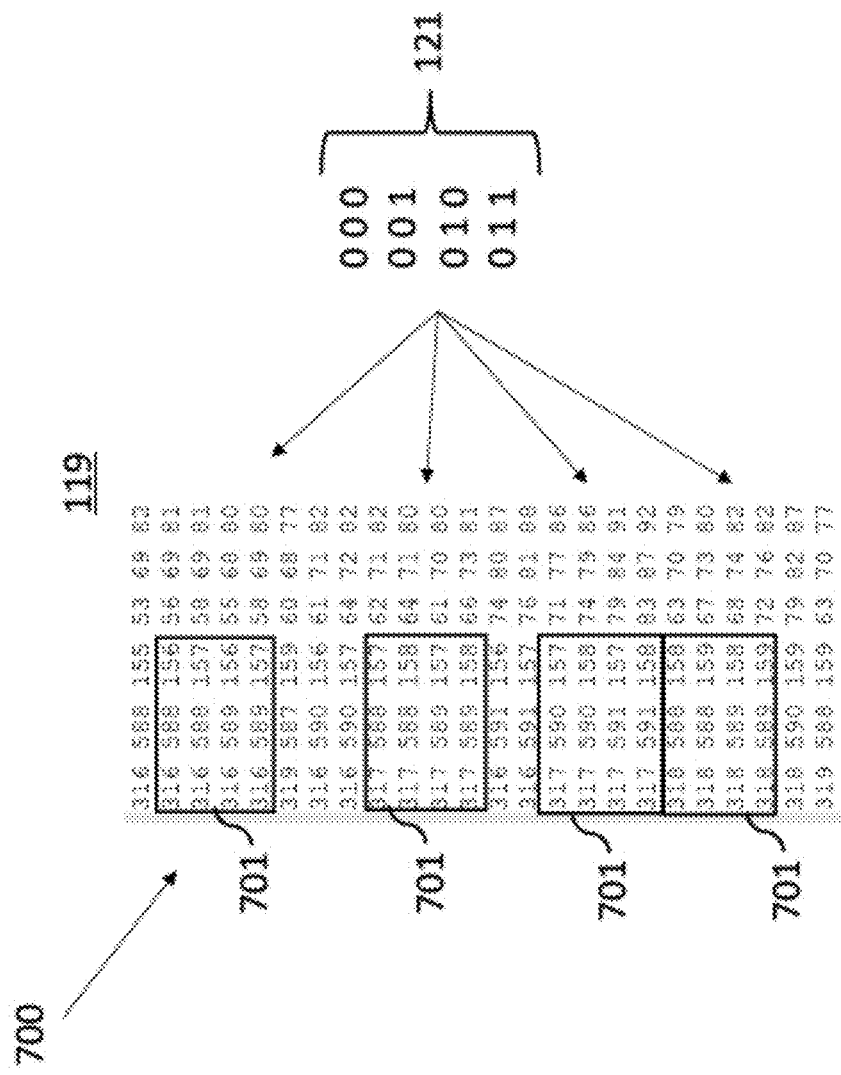
FIG. 7. illustrates an example of quantized points in sequence order and illustrates some of the differential vector patterns that occur that are used for coding in accordance with the embodiments.

In practical datasets, several differential patterns vectors 115 occur most frequently. FIG. 7 illustrates quantized points 700 in sequence order where some sequence order of quantized points in 3D space 119 that occurs in a practical instantiation and illustrates the differential patterns 121 that correspond to blocks 701 in the sequence order of quantized points. In FIG. 7, the vector differential pattern 121 is shown as a 3×4 matrix containing entries that correspond to the difference to the first coordinate. In some implementations one could work with differences compared to the previous coordinate. While many different patterns exist, a vector indices can be observed in practice, which can be exploited for coding using codewords 122 and entropy coding scheme 116.

Storing frequency of occurrence of the differential vector patterns 115 in a codebook 128 for indexing can help a lot the compression of this content. Due to the Morton order and voxelized nature of the data, up to a limited number of patterns occur will occur most frequently, while up to one or two patterns may comprise half of all detected differential vector patterns. This nature of the vector differential patterns is what allows for compression of the distribution of differential vector patterns that can be used by an Entropy coding scheme 116. This property was found in all of the 10 bit voxelized point cloud datasets investigated so far, and an assumption has been made that this property relates to the density, voxelization and sorting of the data. Different entropy coding schemes can be exploited to code the resulting plurality of codewords 122, such as m-ary arithmetic coding, binary arithmetic coding, variable length coding using Huffmann codes, Lempel Ziv coding or any other Entropy coding scheme 116 known to efficiently compress. The application of the entropy coding scheme on the codewords will result in a bitstream 123. To help understand the embodiments a bit better, an illustration using FIG. 1 shows a compression computer that is an instantiation of a computer program product running the method disclosed on a personal computer or an electronic apparatus 100 configured to execute the method disclosed herein. The compression computer can include the network interface 102 such as Ethernet-based or any other network-based protocol such as wifi, ZigBee etc and the processing unit 103 for processing program instruction. The compression computer 101 contains the memory 104 that stores the different structures to execute the disclosed method and store the resulting data structures. The circuitry 110 can connect components via a high speed bus, in addition circuitry can be used to implement the memory 104, the processing unit 103 or other parts of the compression computer 101.

Figure 6:
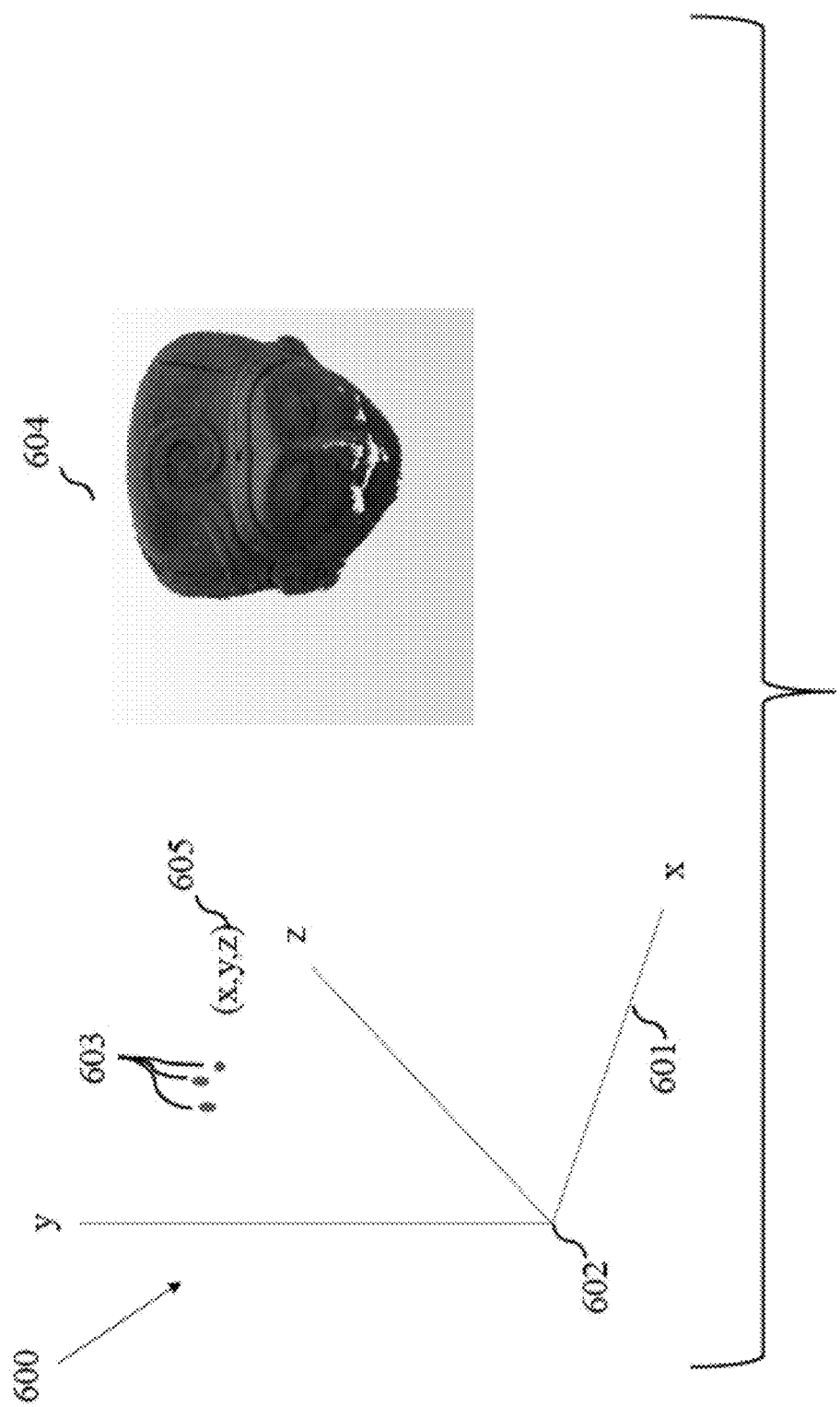
FIG. 6. illustrates some of the fundamentals of point cloud data including coordinate axis, point cloud coordinates and shows a visualization of a point cloud in accordance with the embodiments.

The memory 104 in compression computer 101 includes processing instructions 105. The instructions include a routine for 3D point cloud quantization 111, possibly using a routine to find the intrinsic resolution 132 of the point cloud by computing the media nearest neighbor distance between points and matching the quantization step size to this. In addition, a Morton Index Calculator routine 112 can be included to rapidly convert quantized points in 3D space 118 to Morton indexes 802. Another program sequence of instructions stored in the memory is the sorting algorithm that can be used to sort the quantized points in 3D space 118 to a sequence order of quantized 3D points 119 in 3D space. This sort algorithm could be any sort algorithm including bubble sort, merge sort, counting sort or any other sorting algorithm as known in the scientific and technical literature. FIG. 1. also illustrates the routines for delta differential vector pattern detection 115 and Morton index difference calculation 112 stored as a sequence of processing instructions 105. In addition, FIG. 1 shows that the memory 104 also stores one or more processing instructions 105 for applying an Entropy coding scheme 116. Together these program instructions 105 that enable execution of the disclosed method on a compression computer, or electronic apparatus. FIG. 1 shows that in addition, the memory stores context data that is key for achieving the point cloud compression in an effective manner using an entropy coding scheme 116. The compression computer operates on points in 3D space as input and produces an output bitstream. The memory 104 and processing unit 103 can be connected through any connection for communication of the data such as a highspeed bus implemented by a circuitry 110. The input data can be acquired by a sensor I/O system 109 that is connected to sensor devices for acquiring point cloud data such as LiDaR cameras, depth sensing cameras, Time of flight cameras, 3D reconstruction from images or motion and many other sources of 3D point data. Alternatively, point cloud data containing the points in 3D space can be acquired from file I/O system 108 as shown in FIG. 1. The file I/O system can be a file reader or writer as commonly supported in an operating system such as windows or Linux. The File I/O system 108 can be used to read or write a point cloud or a bitstream 123 in any file format that can represent the points in 3D space 603 as illustrated in FIG. 6.

The context data includes codebooks 128 for the codewords 122, for the coordinate distribution of differential vector patterns 126 and the Morton index differences 22. In addition, the compression computer contains a memory, possibly a volatile memory, to store the different datastructures introduced, including the 3D point data 107: the sequence order of quantized points in 3d space 119, the Morton Index Differences 120 and the Differential Vector Patterns 121, the codewords 122 for the entropy coding scheme 116, the bitstream 123 and information related to 3D partitioning 124. The flow chart 200 of FIG. 2. shows that in addition, prior to the method, point cloud data can be partitioned in the 3D space using a subdivision of 3D space 309 as in FIG. 3. Examples of such subdivision include octree-based methods or subdivision in voxels, with each leaf voxels containing a subset of the points. By using such a subdivision, locality is improved, as the point cloud is spatially partitioned. Such 3D partitioning 117 can have several advantages using it together with the method disclosed. The sort will run on a smaller dataset reducing the computational time, in addition, the signaling of the start coordinate can be coded with fewer bits. The largest advantage of using the spatial partitioning is that it provides a context for the encoding, in other words different regions in the point cloud partition may use different contexts, such as different codebooks 128 for the differential vector patterns 121 and Morton Index Differences 120. In addition, due to the spatial partitioning using a 3D partitioning 117, large coordinate jumps are between points in order are also avoided.

The embodiments disclosed herein includes, a method 200, comprising the following steps is shown in FIG. 2: 201 Identifying a plurality of quantized points in 3D space 118; This for example in some embodiments can include detecting the positions of points in 3D space 603 and quantizing the points in 3D space to the plurality of quantized points in 3D space 118; Defining at 202, by controlling circuitry, a sequence order of the quantized points in 3D space 118; In a preferred embodiment the sequence order of the quantized points in 3D space 118 is based on ascending Morton indexes; at 203, the method identifies Differential Vector Patterns 121 in the sequence order of quantized points in 3D space 119; In many practical cases, the sequence order of quantized points in 3D space 119 and the voxelized nature of the data make it likely that Differential Vector Patterns 121 occur, these Differential Vector Patterns 121 are then identified and are used for generating codewords 122 by comparing to values in codebooks 128 in some of the preferable embodiments; at 204, the method identifies Morton Index Differences 120 in the sequence order of quantized points in 3D space 119; In cases when the sequence order of quantized points in 3D space is based on Morton index sorting, the Morton index difference can be used at 205 as a predictor for differentially encoding the 3D positions, for example, it is likely that the next point in the sequence has Morton difference 1 or 2 when the sequence order of quantized points in 3D space is based on ascending Morton indexes.

The resulting distribution of Morton index differences 127 can be tracked based on training data or previous encodings used to generate codebooks 128. The disclosed method additionally comprises coding the one or more quantized points in 3D space 118 representing Differential Vector Patterns 121 in a first plurality of codewords 122 as part of step 205; As the sequence is sorted and in case the point cloud data originate from a dense voxelized point cloud, differential vector patterns 115 can occur that are useful for coding the information in the first plurality of codewords 122. The disclosed method additionally comprises: 206 coding the one or more of the quantized points in 3D space 118 using the Morton Index Differences 120 in a second plurality of codewords 122; By using differential coding 114 using Morton indexes differences 3, one can code the one dimensional Morton index differences 120 instead of the 3-dimensional difference, resulting in usage of less bits. In addition, small values like 1 and 2 are likely to occur reducing the number of bits required in the bitstreams. In preferred embodiments, the method also comprises storing a subset of the distribution of Morton index differences 127 in codebooks. The method additionally comprises: 207 Combining the first and second plurality of codewords 122 into a third plurality of codewords 122; and 208 Coding the third plurality of codewords using an Entropy coding scheme 116 into a bitstream 123.

FIG. 6. illustrates the coordinate axis 601, the respective origin 602 and the points in 3D space 603 with x,y,z coordinates. In addition a rendered/visualized 3D point cloud is shown in 604.

In addition, this embodiments disclose a computer program product 100 comprising a nontransitive storage medium 104, where the computer program product 100 defines a processing instructions 105 for coding a plurality of points in 3D Space 603, said computer program product, when executed by processing circuitry of a computer, performs a method, the method comprising: identifying a plurality of quantized points in 3D space 118; defining, by controlling circuitry 110, a sequence order of the quantized points in 3D space 119; Identifying Differential Vector Patterns 121 in the sequence order of quantized points in 3D space 119. Identifying Morton Index Differences 120 in the sequence order of quantized points in 3D space 119; Coding one or more of the quantized points in 3D space using Differential Vector Patterns 121 in a first plurality of one or more codewords 122; Coding one or more of the quantized points in 3D space 118 using the Morton Index Differences 120 in a second plurality of codewords 122; Combining the first and second plurality of codewords into a third plurality of codewords 122; Coding the third plurality of codewords using an Entropy coding scheme 116 into a bitstream 123.

In preferred embodiment the sequence order of quantized points in 3D space 119 is based on Morton order indexing 3. Based on computing the Morton index, the sort can be computed based on the Morton indexes, for example in ascending order or descending order using any of the sequence sorting algorithms. Different sorting algorithms can be chosen based on the number of points and the memory and processing unit power available.

In another preferred embodiment the points in 3D Space 603 are first partitioned by a 3D octree-based partitioning 117 (e.g. octree-based partitioning). This brings many advantages, allowing to change the context for the partition, such as selecting different codebooks and entropy coding contexts for the partition. In addition, it improves the locality of points avoiding very large index jumps that are expensive to code.

In preferred embodiments the method can also include, identifying an Intrinsic resolution 132 of the plurality of points in 3D space and where identifying the quantized points in 3D space uses a quantization step size 16 matching the identified Intrinsic resolution 132; Point clouds can be irregularly or regularly sampled, however it is useful to know the most frequently occurring minimum neighbor distance between points. This can be seen as the smallest quantization step size that is needed and based on this Intrinsic resolution 132 the quantizer can be selected.

The method disclosed, in many embodiments will also comprise: encoding 3D Attributes 131 by using the local proximity of the sequence order of the quantized points using differential coding 114 or localized transform coding 130. Attributes of the point cloud can be traversed using the sequence order of quantized points in 3D space, resulting in 1D signal preserving some of the locality, this signal can then be coded lossless using differential coding 114 or lossy using transform coding such as Discrete cosine transform, region adaptive hierarchical transform (RAHT).

An important way of taking advantage of this method is used in many embodiments, by having the first plurality of codewords 122 based on indexing codebooks 128 trained on the coordinate distribution of differential vector patterns 126. As few of the differential vector patterns occur frequently, coding them using specific codewords allows for reducing the size of the bitstream 123. Further, the method disclosed, will use in preferred embodiments the second plurality of codewords 122 based on the index of codebooks 128 generated based on the distribution of Morton index differences 127 in the sequence order of quantized points in 3d space 119. By training codebooks for the Morton index differences 120, better coding efficiency can be achieved.

In FIG. 7, some examples of the differential vector patterns 121 are identified on a sequence order of quantized points in 3D space 119. The points in order are proximate due to the sorting, and exhibit differential vector patterns 121 as illustrated in FIG. 7 with the 3 by 4 matrix [[0 0 0], [0 0 1], [0 1 0], [0 1 1]] as an example differential vector pattern. While FIG. 7. shows some examples, many different differential vector patterns 121 can occur on point cloud data. However, for a sequence order of points in 3D space 119, such patterns tend to be skewed to a few frequently occurring patterns that can be found in the sequence of points in 3D space 119 using a search routine processing instructions for differential vector patterns 115. For each point the differential vector pattern is detected by taking the difference with point k+1, k+2, k+3. This order is not the only option, for example points could be evaluated in reverse order comparing points k−1, k−2, k−3.

Figure 8:
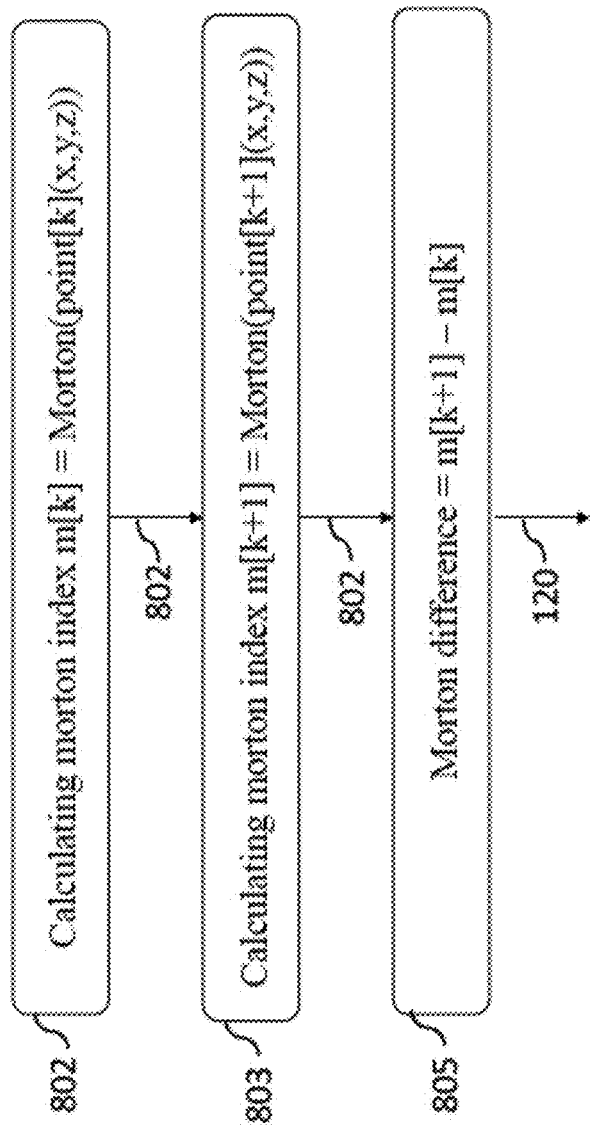
FIG. 8. depicts the steps involved with a calculation of Morton index differences in accordance with the embodiments.

In addition to the detection of differential vector pattern 115, FIG. 8 also illustrates the process 800 of calculation of Morton index differences, where the Morton index is calculated at 802 and 803 by applying Morton index calculation instructions 112, which are well known methods for converting 3D points to Morton indexes. These processing instructions 105 can be stored as Morton index calculator routing 115 in the memory 104. The Morton index difference calculation comprises 3 steps. For the first point the Morton index is computed m[k] at 802 then the Morton index m[k+1] is computed at 803. Then last, the Morton index difference 120 is stored as m[k+1]-m[k] at 805. This is an example of a way to calculate such Morton indexes calculation (differences) 112 which is disclosed herein.

In addition, the embodiments can include an electronic apparatus 100 comprising: memory 104; a controlling circuitry 110 being configured to: Identify a plurality of quantized points in 3D space 118; define, a sequence order of the quantized points in 3D space 3; Identify Differential Vector Patterns 121 in the sequence order of quantized points in 3D space 119. Identify Morton Index Differences 120 in the sequence order of quantized points in 3D space 119; Coding the one or more of the quantized points in 3D space 118 using Differential Vector Patterns 121 in a first plurality of one or more codewords 122; Coding the one or more of the quantized points in 3D space 118 using the Morton Index Differences 120 in a second plurality of codewords 122; Combining the first and second plurality of codewords into a third plurality of codewords 122; and Coding the third plurality of codewords using an Entropy coding scheme 116 into a bitstream 123.

The electronic apparatus 100 can be any electronic device composed of circuitry such as a mobile phone, a tablet computer, a laptop or an embedded device, or a device with customized circuitry to execute the configuration. The electronic apparatus will in some embodiments be additionally configured to: identify an Intrinsic resolution 132 of the plurality of points in 3D space 603 and identify the quantized points in 3D space 118 using a quantization step size 16 that matches the identified Intrinsic resolution 132; similar as in previous embodiment, the intrinsic resolution can be used to compute the preferred step size.

The electronic apparatus 100 can have aconfiguration additionally configured to: include encoding 3D Attributes 131 by usage of the local proximity of the sequence order of the quantized points in 3D space 118 using differential coding 114 or localized transform coding 130. Point clouds typically have attributes attached to them such as colors, reflectance normal, by exploiting the locality the attributes can be coded using transform coding such as wavelet based coding, discrete cosine transform coding or any other form of localized transform coding 130. The electronic apparatus 100, may additionally be configured to have the first plurality of codewords 122 based on indexing codebooks 128 trained on a coordinate distribution of differential vector patterns 126. Further, the configuration supports the second plurality of codewords 122 stored in memory 104 to be based on the distribution of Morton index differences 127 in the sequence order of quantized points in 3D space 119. In some embodiments, the electronic apparatus may additionally be configured to: include encoding 3D Attributes 131 by differential coding 114 or localized transform coding 130 based on the sequence order of quantized points in 3d space 119.

Figure 4:
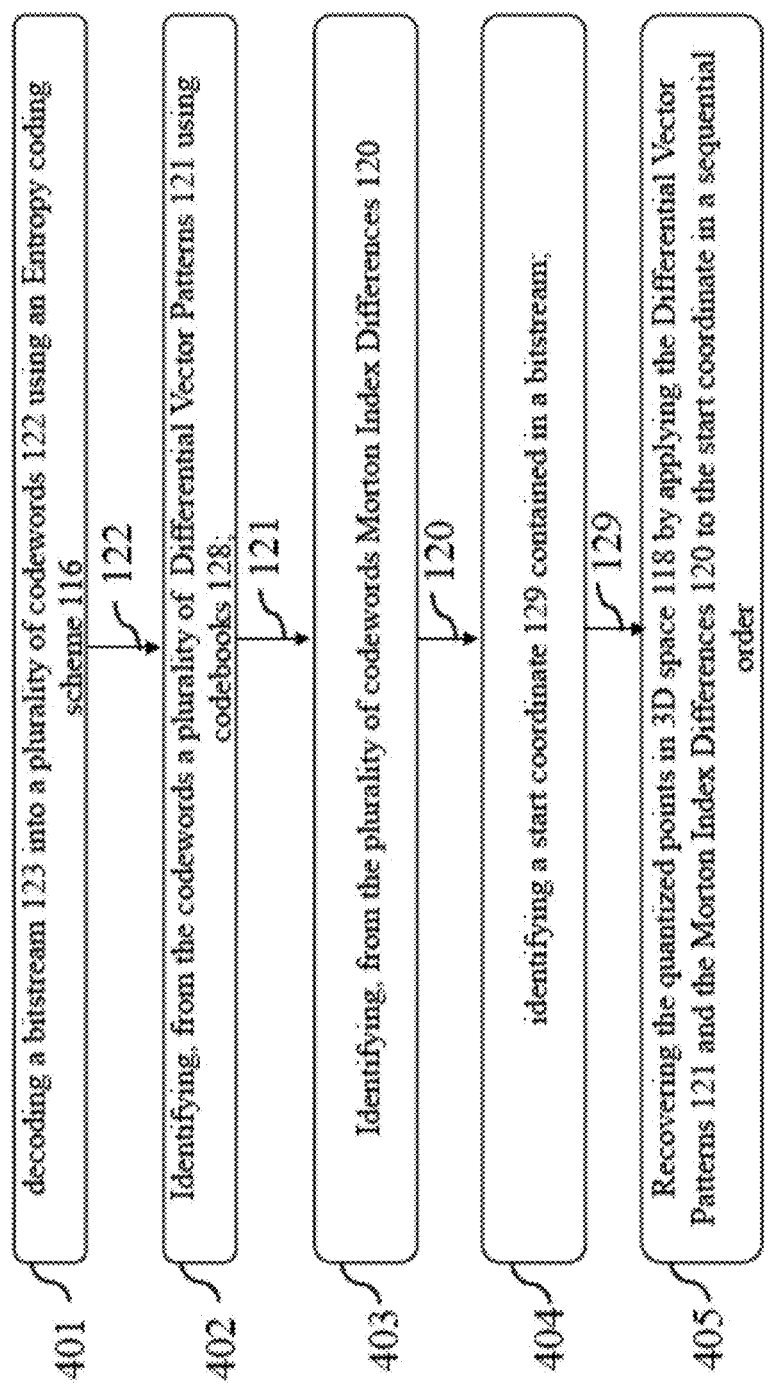
FIG. 4. illustrates a second method disclosed for decoding in accordance with the embodiments.

The embodiments in addition discloses a method, such as a computer program product 100 and electronic apparatus for retrieving and decoding a point cloud consisting of points in 3D space 603 from a bitstream 123. These disclosures, allow for retrieving and recovering a point cloud 605 or sequence order of quantized points in 3D space 119 from a bitstream 123. FIG. 4 illustrates the steps comprised with this method.

More precisely, the method 400 of FIG. 4 can include the step 401 of decoding a bitstream 123 into a plurality of codewords 122 using an Entropy coding scheme 116 and identifying at 402, from the codewords a plurality of Differential Vector Patterns 121 using codebooks 128. The method 400 can further include identifying at 403, from the plurality of codewords Morton Index Differences 120 and identifying at step 404 a start coordinate 129 contained in a bitstream 123. At step 405, the method recovers the quantized points in 3D space 118 by applying the Differential Vector Patterns 121 and the Morton Index Differences 120 to the start coordinate 129 in a sequential order.

This method above discloses how the point cloud data 107 can be retrieved from the bitstream 123. The method also comprises in some embodiments: decoding the bitstream 123 including identifying a flag byte 309 for selecting the right context data 106. A flag byte can be embedded in the bitstream 123 to signal context selection for the entropy coding scheme 116. In some embodiments, the method also comprises decoding the bitstream including, identifying a start coordinate 129 for applying the Differential Vector Patterns 121, the Morton index differences. In some embodiments, the method will additionally include decoding of 3D attributes by inverse localized transform coding 130 or inverse differential coding 114.

A computer program product is a product that when exectuted on a computer executes a method. A computer program product can be a software, or a firmware that includes processing instructions and that can be installed on a compression computer.

Some embodiments can include a computer program product 100 comprising a non-transitive storage medium 104, where the computer program product 100 defines a processing instructions 105 for decoding a plurality of points in 3D Space 603, where the computer program product, when executed by processing circuitry of a computer, performs a method, the method comprising: 401 decoding a bitstream 123 into a plurality of codewords 122 using an Entropy coding scheme 116; 402 Identifying, from the codewords a plurality of Differential Vector Patterns 121 using codebooks 128; 403 Identifying, from the plurality of codewords Morton Index Differences 120; Identifying a start coordinate 129 contained in a bitstream 123 at 404; and at 405, recovering the quantized points in 3D space 118 by applying the Differential Vector Patterns 121 and the Morton Index Differences 120 to the start coordinate in a sequential order;

In preferred embodiments, the executed method can also include: decoding the bitstream 123 which includes identifying a flag or byte 309 for selecting the right context to use for the entropy coding scheme 116. In most embodiments, the executed method also caninclude: decoding the bitstream including identifying a start coordinate 129 for applying the Differential Vector Patterns 121, the Morton Index Differences 120. This application includes the de-quantization and inverse differential encoding of Morton indexes and differential vector patterns.

In addition, in the computer program product disclosed, the executed method also includes: decoding of 3D Attributes 131 by inverse localized transform coding 130 or inverse differential coding 114.

In addition an electronic apparatus is disclosed, the apparatus can include: memory; a controlling circuitry 110 being configured to: decode a plurality of codewords coded from a bitstream 123 using an entropy coding scheme 116; Identify, from the codewords 122 a plurality of Differential Vector Patterns 121 by using codebooks 128; Identify, from the plurality of codewords Morton Index Differences 120; Identify a start coordinate 129 contained in a bitstream; recover the quantized points in 3D space by applying the Differential Vector Patterns 121 and the Morton Index Differences 120 to the start coordinate in a sequential order.

The electronic apparatus, in preferred embodiments, is additionally configured to: decode the bitstream 123 and identify a flag byte 309 to select context data 106 for the Entropy coding scheme 116. The electronic apparatus is additionally configured to: decode the bitstream 123 and identify a start coordinate 129 in the bitstream for applying the Differential Vector Patterns 121, the Morton Index Differences 120 to obtain the points in 3D space 603. In some embodiments, the electronic apparatus is additionally configured to: decode the 3D attributes by inverse localized transform coding 130 or inverse differential coding 114.

Figure 5:
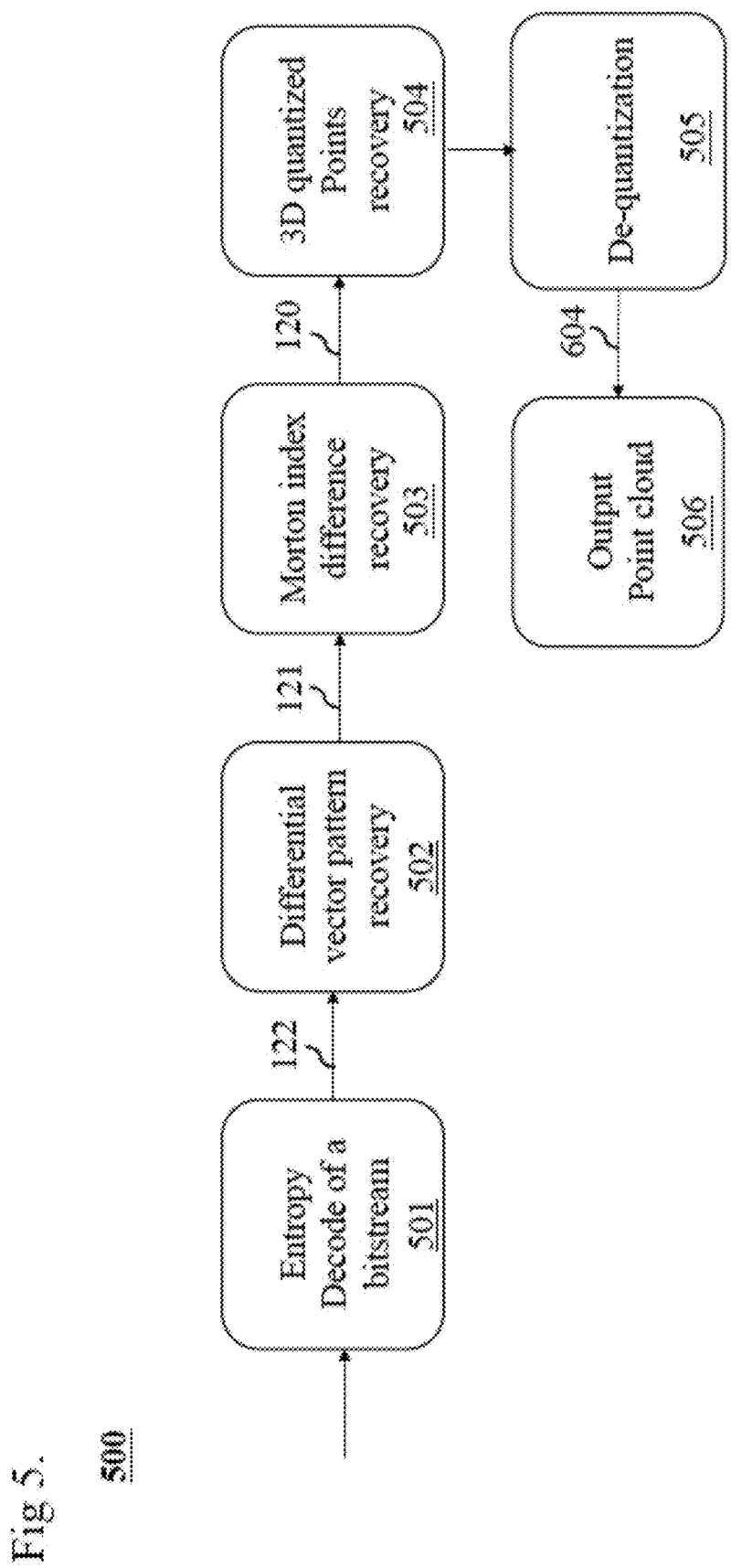
FIG. 5. illustrate steps involved in a computer program product or an electronic apparatus that is executing the disclosed method in accordance with the embodiments.

FIG. 5 shows the steps involved in the method or system 500 executed by the computer program product 100 or electronic apparatus in different components in circuitry 110. The method or system 500 can include an entropy decode 501 of a bitstream 123, differential vector patter recovery at 502 and Morton index recovery at 503 followed by 3D quantized points recovery at 504 followed by de-quantization at 505 resulting in the output point cloud 506 which is represented by a plurality of points in 3D space 603 as shown in FIG. 6.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuitry," "module," "component,", "electronic apparatus" or "system." Furthermore, aspects of the present disclosure may take the form of a computer program product comprising one or more computer readable media having computer readable program code embodied thereon.

A computing device or electronic apparatus is further intended to represent various forms of digital computers, such as laptops, desktops, workstations, personal digital assistants, servers, blade servers, main-frames, and other appropriate computers. Computing devices are intended to represent various forms of mobile devices, such as personal digital assistants, cellular telephones, smart phone, and other similar computing devices.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, C++, C #, VB.NET, Python, Vala, GEM, or the like, conventional procedural programming languages, such as the "C" programming language, Visual Basic, Fortran 2003, Perl, PHP, dynamic programming languages such as Python and Ruby or other programming languages. The program code may execute entirely on the user's computer, partly on the user's computer, as a stand-alone software package, partly on the user's computer and partly on a remote computer or entirely on the remote computer or server or "cloud". In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS) and Security as a Service (SECaaS). Further, the use of virtualization techniques such as using hypervisors based virtualization or operating system level virtualization to implement the proposed schemes is not precluded.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations or portions of blocks in the flowchart illustrations and/or block diagrams, can be implemented by computer program instructions or by hardware or any combination thereof. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Any electronic apparatus or circuitry can be used to store and execute the computer program instructions. Examples of such include a mobile phone device, a tablet computing device, a smart watch, a 3D vision system, a virtual reality system, an augmented reality system, a sensor system that includes a memory for storing the computer program instruction and a processing unit for executing the computer program instructions. Alternative electronic apparatus may be dedicated hardware for point cloud processing that use a memory for storing the program instructions and a processing unit for executing instructions.

It is to be understood that the terminology used herein is for the purpose of describing particular embodiments only and is not intended to be limiting of the embodiments herein. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

We claim:

1. A method, implemented by way of controlling circuitry including a processing unit, comprising:
   identifying a plurality of quantized points in 3D space represented in memory;
   defining a sequence order of the quantized points in 3D space;
   identifying differential vector patterns in the sequence order of quantized points in 3D space;
   identifying Morton index differences in the sequence order of the quantized points in 3D space;
   coding the quantized points in 3D space using differential vector patterns in a first plurality of codewords;
   coding the quantized points in 3D space using the Morton index differences in a second plurality of codewords;
   combining the first and second plurality of codewords into a third plurality of codewords;
   coding the third plurality of codewords using an entropy coding scheme into a bitstream stored in memory; and
   communicating the bitstream via a network interface wherein the bitstream includes 3D attributes by differential coding or localized transform coding based on a sequence order of quantized points in 3D space used for rendering an object.

2. The method of claim 1 where the sequence order of the quantized points in 3D space is based on a Morton order index calculation, wherein the method uses a one-dimensional predictor of delta coding of geometric information based on coding the Morton index differences and the plurality of quantized points is stored in a point cloud.

3. The method of 1, where the quantized points in 3D Space are first partitioned by a 3D octree-based partitioning.

4. The method of claim 1, further comprising, identifying an intrinsic resolution of the plurality of quantized points in 3D space, and where identifying the quantized points in 3D space uses a quantization step size 16 matching the identified intrinsic resolution.

5. The method of claim 1, including encoding 3D attributes by using the local proximity of the sequence order of the quantized points using differential coding or localized transform coding.

6. The method of claim 1, where the first plurality of codewords are based on indexing codebooks trained on the coordinate distribution of differential vector patterns.

7. The method of claim 1, where the second plurality of codewords are based on the index of codebooks generated based on the distribution of Morton index differences in the sequence order of quantized points in 3D space.

8. The method of claim 1, wherein the method further comprises the steps of
   decoding a plurality of codewords coded using an entropy coding scheme in a bitstream;
   identifying, from the codewords a plurality of differential vector patterns using codebooks;
   identifying, from the plurality of codewords Morton index differences;
   identifying a start coordinate contained in a bitstream;
   recovering the quantized points in 3D space by applying the differential vector patterns, the Morton index differences to the start coordinate in a sequential order.

9. A computer program product, comprising:
   a nontransitive storage medium, where the computer program product defines processing instructions for coding a plurality of points in 3D Space, the computer program product, when executed by processing circuitry of a computer, performs a method, the method comprising:
   identifying a plurality of quantized points in 3D space;
   defining, by controlling circuitry, a sequence order of the quantized points in 3D space;
   Identifying Differential Vector Patterns in the sequence order of quantized points in 3d space;
   identifying Morton index differences in the sequence order of quantized points in 3d space;
   coding one or more of the quantized points in 3D space using differential vector patterns in a first plurality of one or more codewords;
   coding one or more of the quantized points in 3D space using the Morton index differences in a second plurality of codewords;
   combining the first and second plurality of codewords into a third plurality of codewords; and coding the third plurality of codewords using an Entropy coding scheme into a bitstream.

10. An electronic apparatus consisting of controlling circuitry, comprising:
a memory for temporarily storing a plurality of quantized points in 3D space;
a processing unit being configured to:
identify the plurality of quantized points in 3D space;
define, by controlling circuitry, a sequence order of the quantized points in 3D space in the memory;
identify differential vector patterns in the sequence order of quantized points in 3D space;
identify Morton index differences in the sequence order of quantized points in 3D space;
coding one or more of the quantized points in the 3D space using differential vector patterns by a first plurality of one or more codewords;
coding one or more of the quantized points in 3D space using the Morton index differences in a second plurality of codewords;
combining the first and second plurality of codewords into a third plurality of codewords; and
coding the third plurality of codewords using an entropy coding scheme into a bitstream stored in the memory; and
a networking interface to communicate the bitstream.

11. The electronic apparatus of claim 10, the processing unit further configured to: identify an intrinsic resolution of the plurality of points in 3D space and identify the quantized points in 3D space uses a quantization step size 16 that matches the identified Intrinsic resolution.

12. The electronic apparatus of claim 10, the processing unit further configured to: include encoding 3D Attributes by usage of the local proximity of the sequence order of the quantized points in 3D space using differential coding or localized transform coding.

13. The electronic apparatus of claim 10, additionally configured to have the first plurality of codewords based on indexing codebooks trained on a coordinate distribution of differential vector patterns.

14. The electronic apparatus of claim 10, where the configuration supports the second plurality of codewords stored in memory are based on the distribution of Morton index differences in the sequence order of quantized points in 3D space.

15. The electronic apparatus of claim 10, the electronic apparatus additionally configured to: include encoding 3D attributes by differential coding or localized transform coding based on the sequence order of quantized points in 3D space.

16. A method, implemented by way of controlling circuitry including a processing unit, comprising:
receiving a bitstream via a network interface wherein the bitstream includes 3D attributes by differential coding or localized transform coding based on a sequence order of quantized points in 3D space;
decoding a plurality of codewords coded in the bitstream using an entropy coding scheme;
identifying, from the codewords a plurality of differential vector patterns using codebooks;
identifying, from the plurality of codewords Morton index differences;
identifying a start coordinate contained in a bitstream;
recovering the quantized points in 3D space by applying the differential vector patterns, the Morton index differences to the start coordinate in a sequential order; and
rendering a representation of an object associated with the quantized points in 3D space.

17. The method in 16, where decoding the bitstream includes identifying a flag byte for selecting the right context to use for the entropy coding scheme.

18. The method in 16, where decoding the bitstream includes identifying a start coordinate for applying the Differential Vector Patterns, the Morton index differences.

19. The method in 16, additionally comprising decoding of 3D attributes by inverse localized transform coding or inverse differential coding.

20. The method in 16, wherein the method exploits properties of sort order and voxelized nature of point cloud of patterns occurring in differential vector patterns using Morton index differences to provide an extremely computationally light decoding process relative to decoding processes using octree-based coding or projection based methods.

* * * * *